United States Patent [19]

Hollander

[11] 4,077,256
[45] Mar. 7, 1978

[54] STRINGED RACKET FACE TENSION MEASURING DEVICE

[76] Inventor: Bruce Lee Hollander, 1025 Tyler St., Hollywood, Fla. 33020

[21] Appl. No.: 758,190

[22] Filed: Jan. 10, 1977

[51] Int. Cl.² ............................................. G01L 5/08
[52] U.S. Cl. ..................................................... 73/145
[58] Field of Search ................................. 73/144, 145

[56] References Cited

U.S. PATENT DOCUMENTS

| | | | |
|---|---|---|---|
| 1,322,123 | 11/1919 | Larson | 73/144 |
| 3,149,489 | 9/1964 | Schmaeng | 73/144 |
| 3,194,063 | 7/1965 | McKean | 73/100 |

FOREIGN PATENT DOCUMENTS

| | | | |
|---|---|---|---|
| 126,332 | 1/1948 | Australia | 73/145 |
| 567,476 | 12/1923 | France | 73/145 |

Primary Examiner—Charles A. Ruehl
Attorney, Agent, or Firm—Ernest H. Schmidt

[57] ABSTRACT

A rounded abutment member is mounted for reciprocative sliding movement in the normal direction with respect to the center of the face of a stringed racket, and hydraulic means is provided for automatically measuring the pressure required for the movement of the abutment member in the racket face abutting direction through a predetermined distance, such measurement being an indication of overall face string tension.

5 Claims, 4 Drawing Figures

STRINGED RACKET FACE TENSION MEASURING DEVICE

This invention relates to stringed rackets and the like and is directed particularly to a device for the measurement of the back pressure imposed by the face of a racket under a predetermined stress simulating impact by a racket ball as an indication of face string tension.

In the stringing of the face of stringed rackets, each run of the string webbing is individually measured and set for its axial tension. The string tension is so chosen that the resiliency or "stiffness" of the webbing or face of the strung racket fits the requirements of the player. Thus, expert players usually require greater string tension for a faster game as compared with the average player. Since age, usage, changes in weather, etc., have a tendancy to "loosen" the original tension of the strings, there is a need for measuring such change in a strung racket. To accommodate this need, various devices for measuring individual string tension have been devised. Such string tension measuring devices, however, are deficient in various respects, principally in that they are difficult to use and inaccurate in their measurement because of friction imposed along the strings by interwoven crossing strings and the increase of tension due to a cumulative effect across the face of the racket. The measurement of the individual strings in a used racket, moreover, will vary widely from string to string, and therefore offer no dependable information as to the overall performance of the racket in play.

It is, accordingly, the principal object of this invention to provide a novel and improved face tension measuring device for stringed rackets and the like, wherein reactive pressure of the face is measured rather than individual string tension, thereby providing for the measurement of the "stiffness" of the webbing or the face of the racket as an indicator of racket performance in play. Such measurements can readily be compared with measurements taken when the racket was first strung to determine relative "loosening" of the racket.

A more particular object is to provide a face tension measuring device of the character described including a rounded abutment member simulating the size and shape of a tennis ball or the like, and means for moving the abutment member perpendicularly into abutting engagement with a central portion of the face of a stringed racket to be measured and through a predetermined further distance, and including means for measuring the pressure required for the movement of said racket face through said predetermined distance as an indicator of racket face or webbing "stiffness".

Another object of the invention is to provide a stringed racket face tension measuring device of the character described which will be simple in construction, easy to use, and dependable and long wearing in operation.

Other objects, features and advantages of the invention will be apparent from the following description when read with reference to the accompanying drawings. In the drawings, wherein like reference numerals denote corresponding parts throughout the several views.

Figure 1:
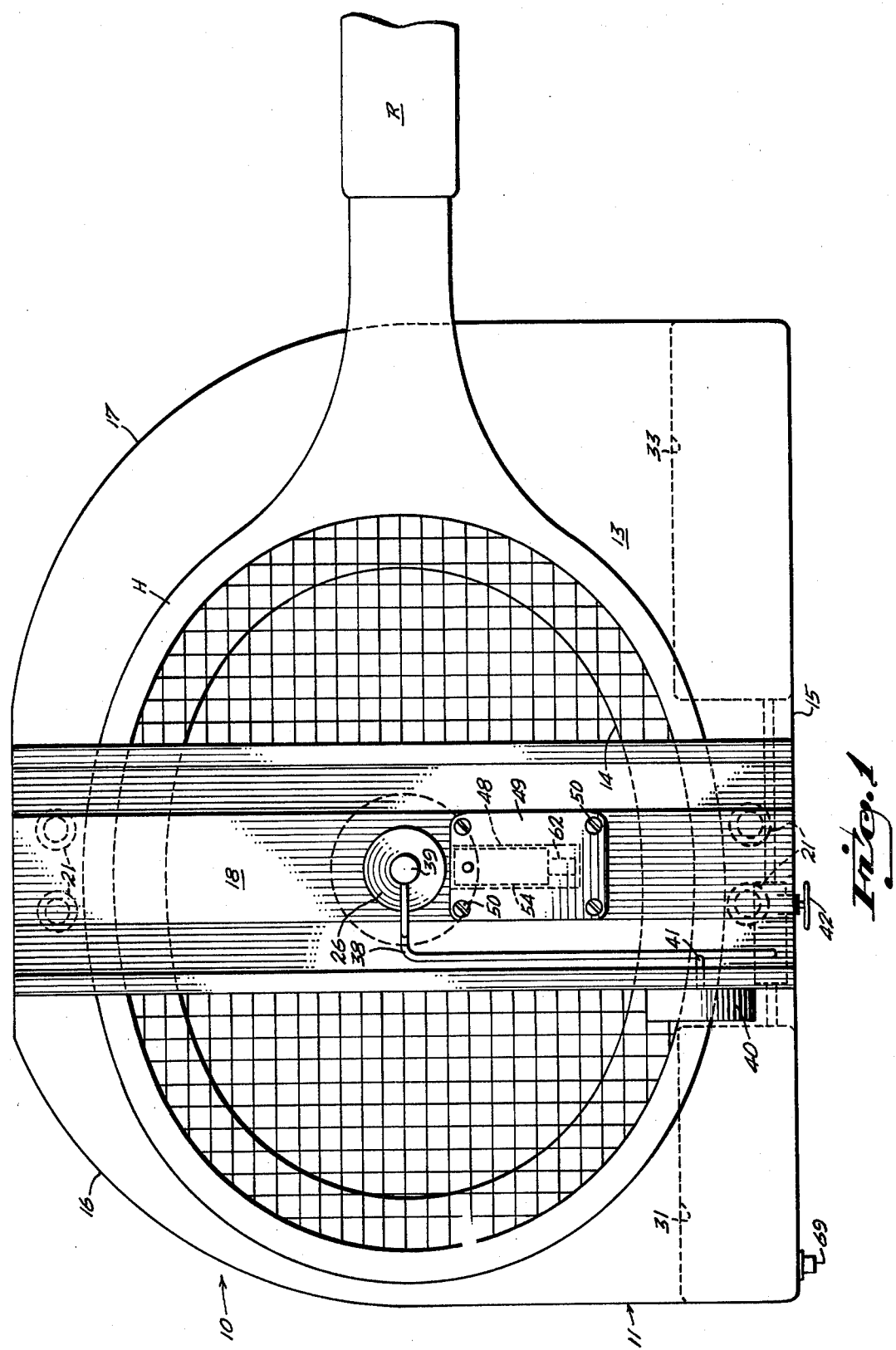
FIG. 1 is a top view of a preferred form of face tension measuring device embodying the invention, shown with the head of a tennis racket positioned therein for measuring the face tension thereof.

Referring now in details to the drawings, reference numeral 10 designates, generally, a hydraulically-actuated, automatic face tension measuring device embodying the invention. The face tension measuring device 10 comprises a base support member 11, which will preferably be formed of metal, such as aluminum. The base support member 11 has parallel lower and upper surfaces 12 and 13, respectively, and is provided with an oval recess or concavity 14 (see FIG. 1) of the same general peripheral shape as that of the face (string webbing network) of an ordinary tennis racket, for example. As further illustrated in FIG. 1, the front of the base support member 11 is rectilinear, as indicated at 15, and the back corners may be arcuately curved, as indicated at 16 and 17.

Centrally secured and extending from front to back upon the upper surface 13 of the base support member 11 is a bridge member 18, said bridge member comprising downwardly-extending front and back leg portions 19, 20, respectively, secured in place as by machine screws 21 passing through the recessed openings in lower surface 12 of said base support member. The bridge member 18 further comprises a central span portion 22 having a substantially flat bottom surface 23 in spaced, parallel relation with respect to the upper surface 13 of the base support member 11 and defining therewith a transversely-extending through opening 24 for reception of the head H of a tennis racket R to be measured for face tension, as is hereinafter more particularly described.

Fitted in a central circular recess 25 formed in the upper surface of the bride span portion 22, is a hydraulic cylinder 26, said hydraulic cylinder being secured in place as by having its forwardly-projecting, reduced-diameter, threaded portion 27 threadingly engage in a complemental, internally-threaded through opening 28 coaxial with central circular recess 25 and extending through the bottom surface 23 of said span portion. Screw-threaded or otherwise fixed upon the outwardly-projecting piston rod 29 of hydraulic cylinder 26 is a hemispherical face abutment member 30 having the same curvature as that of a standard tennis ball.

Figure 2:
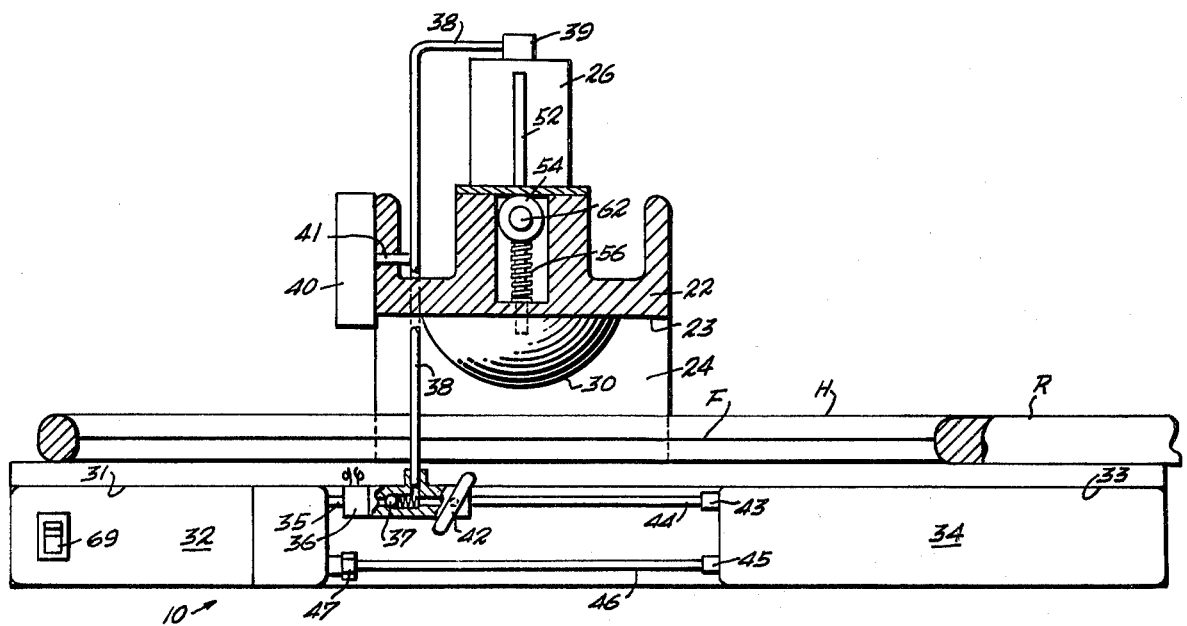
FIG. 2 is a side elevational view of the measuring device illustrated in FIG. 1, with portions thereof broken away to reveal constructional details.

Means is provided for applying hydraulic fluid under pressure to the hydraulic cylinder 26 for lowering the piston rod 29 and its associated abutment member 30. To this end, the front face of the base support member 11 is provided at one side with a rectangular recess 31 within which is secured a hydraulic pump and motor 32, and at the other side with a rectangular recess 33 within which is secured a hydraulic fluid reservoir 34. As best illustrated in FIG. 2, the hydraulic pump and motor 32 has a fluid outlet or pressure port 35 which communicates with the input port of an electric pressure switch 36. The pressure switch 36 comprises a normally open electrical switch adapted to close-circuit upon the exertion of minimal back pressure thereto in the manner and for the purpose hereinafter appearing. The output of the pressure switch 36 communicates with the input of a check valve 37 preventing the return flow of pressurized hydraulic fluid through pressure port 35. The outlet port of check valve 37 communicates through conduit 38 with the hydraulic pressure inlet fitting 39 of the hydraulic cylinder 26. Secured against a side surface portion of the bridge member 18 at the juncture of the front leg 19 and the span portion 22 thereof, is a hydraulic pressure gauge 40, said pressure gauge being in communication with hydraulic pressure conduit 38 through gauge conduit 41. The pressure gauge 40 thus serves to record the hydraulic pressure being applied to the hydraulic cylinder 26 in its movement of face abutment member 30, as is hereinafter more particularly described.

The outlet port of check valve 37 also communicates through shut-off needle valve 42 with hydraulic fluid return port 43 of hydraulic fluid reservoir 34 through conduit 44. Hydraulic fluid supply port 45 of hydraulic fluid reservoir 34 connects, through conduit 46, with hydraulic fluid inlet fitting 47 of hydraulic pump and motor 32.

In operation of the measuring device as is hereinafter more particularly described, means is provided for automatically measuring the reactive pressure imposed by downward movement of the face abutment member 30 in pushing downwardly against the face (string webbing) F of a tennis racket R through a predetermined distance of lateral deflection from its normal planar disposition by the full-line representation thereof in FIGS. 2 and 3. To this end, the upper surface of the bridge member span portion 22 is provided with a deep rectangular recess 48 closely adjacent the central circular recess 25. The rectangular recess 48 is provided with a cover plate 49 removably secured in place by machine screws 50 (see FIG. 1), said cover plate having a through opening 51 within which is vertically slidable a gauge rod 52 the lower end of which extends through a vertically aligned through opening 53 in the bottom wall of said rectangular recess. The lower end of the gauge rod 52 is secured to the face abutment member 30 as by being screw-threaded in a complemental threaded-opening therein, so that said gauge rod moves up and down in unison with said abutment member in the manner and for the purpose hereinafter appearing.

Vertically slidably disposed within the rectangular recess 48 is a rectangular clamp block 54, said clamp block having a vertically-extending through opening 55 through which the gauge rod 52 extends for relative sliding movement. A helical compression spring 56 circumjacent the gauge rod 52 and constrained between the under-surface of the clamp block 54 and the upper surface of the abutment member 30, serves normally to resiliently urge said clamp block in its uppermost rest position against the underside of the cover plate 49. The clamp block 54 is provided with a circular recess 57 at one end, within which is fitted an annular solenoid winding 58 having electrical energization conductors 59, 60. The circular recess 57 communicates at its inner end with coaxial, reduced-diameter bore 61 which opens into the vertically-extending through opening 55. Slidably received through the central opening of the annular solenoid 58 is a cylindrical armature 62 having a coaxial, reduced-diameter abutment rod portion 63 slidably received with coaxial bore 61. As is hereinafter more particularly described, upon energization of the solenoid winding 58, the armature will be withdrawn more fully into the central opening thereof so that the forward end of the abutment rod portion 63 abuttingly clamps against a side-wall portion of the gauge rod 52 whereby the clamp block 54 will thereafter move downward in unison with said gauge rod and the associated face abutment member 30.

Figure 3:
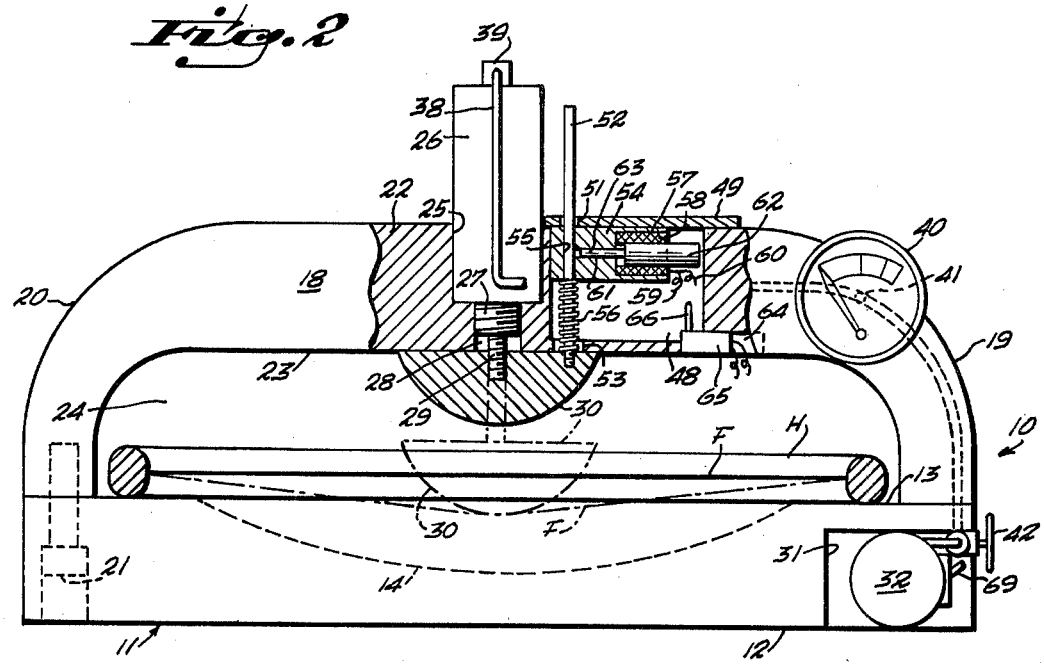
FIG. 3 is a front elevational view thereof with portions broken away to reveal constructional details.

As further illustrated in FIG. 3, the bottom surface 23 of the bridge span portion 22, is provided with a rectangular opening 64 which communicates, at the inside thereof, with the bottom corner of rectangular recess 48. Seated within the rectangular opening 64 is a normally closed-circuited single-pole, single-throw micro-switch 65 having an upwardly-extending switch actuating plunger 66. It will be seen that the switch actuating plunger 66 is directly below the outwardly-projecting end portion of the cylindrical armature 62, so as to be abuttingly actuated thereby when said armature and its associated clamp block 54 moves from the uppermost rest position as illustrated in FIG. 3 to a lower-most position as carried by gauge rod 52 in the manner hereinafter more particularly described.

Figure 4:
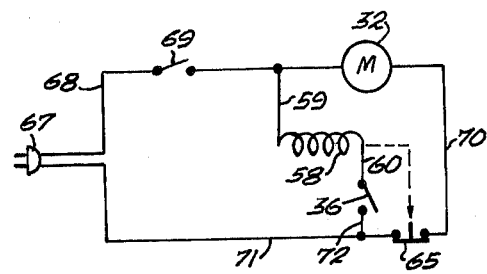
FIG. 4 is an electrical schematic diagram of the measuring device.

Referring now to the electrical schematic diagram of FIG. 4, detailing the energizing circuitry for the tension measuring device, and electrical plug 67, receivable in an electric receptacle providing 110 a.c. service has one conductor 68 connected to one energization terminal of hydraulic motor 32 through on/off switch 69. The remaining energization terminal of hydraulic motor 32 connects, through conductor 70, to one terminal of a single-pole, single-throw micro-switch 65. The remaining terminal of micro-switch 65 returns to the source of electrical supply through conductor 71. A further illustrated in FIG. 4, one terminal of the solenoid winding 58 is also connected to the source of electrical supply through series on/off switch 69, electrical conductor 68, and conductor 59. The remaining terminal of solenoid 58 connects through conductor 60 to one terminal of pressure switch 36, the remaining terminal of said pressure switch being returned to the source of electrical supply through conductors 72 and 71.

Considering now the operation of the face tension measuring device, a tennis racket R to be measured will be placed with its head H extending laterally through the transversely-extending opening 24 to rest flat upon the upper surface 13 of the base support member 11. As best illustrated in FIG. 1, the racket head H will be so placed that the head H is substantially concentric with the oval recess 14 in the base support member 11. After the tennis racket R is so positioned, the on/off switch 69, which may comprise part of the hydraulic pump and motor as illustrated in FIGS. 1, 2 and 3, will be turned on to complete an energization circuit to the hydraulic motor 32 through conductor 68, closed on/off switch 69, conductor 70, normally closed single-pole, single-throw micro-switch 65 and conductor 71. The hydraulic motor 32 will thus be energized to start to pump hydraulic fluid into hydraulic cylinder 26 through pressure port 35, pressure switch 36, check valve 37, and hydraulic conduit 38. This activation of the hydraulic cylinder 26 serves to forcefully lower the associated piston rod 29 together with its face abutment member 30 and the gauge rod 52. Upon the face rod abutment member 30 coming into contact with the face F of the tennis racket head H, resistance will be encountered, resulting in increased back pressure on the piston rod 29 which, in turn, will effect a slight rise in pressure in the hydraulic fluid feed line or conduit 38 sufficient to close the normally open pressure-actuated electrical switch 36. Such closure of the pressure-actuated switch 36 serves to complete an energization circuit to the solenoid winding 58 through conductor 68, closed on/off switch 69, conductors, 71, 72, and closed switch 36.

Energization of solenoid winding 58 effects strong inward movement with respect thereto of the cylindrical armature 62, so that its abutment rod portion 63 is brought into clamping engagement with respect to gauge rod 52. Thus, with reference to FIG. 3, it will be understood that as hydraulic fluid continues to be fed to the hydraulic cylinder 26, not only will the face abutment member 30 and its associated gauge rod 52 continue to move down to exert an increasing stress upon the racket face F, but the clamp block 54 will also be carried along in the downward direction as illustrated in FIG. 3. In this connection it will be understood that until the clamp block 54 is thus clamped in place upon the gauge rod 52 as described above, said clamp block is retained in its upper-most limit position in abutment against the underside of the cover plate 49 by the helical compression spring 56.

When the clamp block 54 is carried downwardly, as described above, to the predetermined distance whereat an outwardly projecting portion of the solenoid cylindrical armature 62 contacts the upwardly projecting switch actuating plunger 66, of the single-pole, single-throw micro-switch 65, said microswitch will open-circuit, thereby deenergizing the above-described energization circuit to hydraulic motor 32, thereby discontinuing any further downward movement of face abutment member 30. At this instant, check valve 37 serves to prevent backflow of pressurized hydraulic fluid to the hydraulic pump 32, thereby preserving the reading of pressure attained as indicated by the hydraulic pressure gauge 40. In this connection, it will be understood that the shut-off needle valve 42 will be retained in closed or shut-off position. From the foregoing, it will be understood that a pressure reading will be obtained on hydraulic pressure gauge 40 which will be a function of the stress imposed upon the face F of the tennis racket under measurement in displacing it a predetermined distance substantially equivalent to the distance between the underside of the solenoid armature 62 when in its uppermost or rest position as illustrated in FIG. 3 and the upper end of the switch-actuating plunger 66 comprising microswitch 65. Since the stress distance thus imposed by the face abutment member 30 of the measuring device will be the same for any racket tested, comparison can readily be made as to the combined tension of the webbing or face strings. Thus, since the reactive force imposed by the face of a racket being measured will be a function of the tension along the string runs comprising the face of the racket combined with the friction imposed along the strings by interwoven crossing strings, the hydraulic pressure gauge can be calibrated in terms of string tension, if so desired, in keeping with customary racket string measuring techniques. Upon completion of the measuring process, the needle valve 42 will be opened for a few seconds to relieve the pressurization of the hydraulic cylinder 26 and its associated fluid circuitry including conduits 38 and 41, thereby placing the system in readiness for the next measurement.

It will be understood by those skilled in the art that the invention permits of various embodiments, modifications, and uses other than those herein specifically described without departing from the essential features of the invention as set forth in the claims annexed hereto. Thus, although I have illustrated and described the invention as used in the measurement of tennis racket face or webbing tension, it is to be understood that the device can be used as well for measuring the face tension of other stringed rackets, such as handball and badminton rackets.

What I claim as new and desire to secure by Letters Patent is:

1. A face tension measuring device for stringed rackets comprising, in combination, means for supporting one side of a stringed racket the face tension of which is to be measured, a face abutment member, means for moving said face abutment member with respect to said supporting means in a direction substantially perpendicular with respect to the racket face at the other side of the supported head thereof, and means for measuring the force required to move said face abutment member in the abutting engagement direction with respect to the racket face through a predetermined distance of sideward deflection of said racket face, said means for moving said face abutment member comprising a rod member connected to said abutment member for movement in unison therewith, an energy source controlling the movement of said rod member in the inward or racket face abutting direction, and means controlled by reactive or back pressure being exerted upon said energy source through said rod member upon said face abutment member first moving into abutting contact with said racket face for automatically limiting further face deflecting movement of said face abutment member to said predetermined distance.

2. A face tension measuring device as defined in claim 1 wherein said energy source comprises a hydraulic system including a hydraulic cylinder having a reciprocative piston rod, said force measuring means comprising a pressure gauge connected in said hydraulic system for measuring the pressure exerted behind said hydraulic piston rod as an indication of stress being imparted to the racket by the movement of said abutment member through said predetermined distance.

3. A face tension measuring device as defined in claim 2 wherein said energy source further comprises a hydraulic pump having a pressurized fluid port, a normally open pressure-actuated electrical switch having input and output ports, the input port of said pressure-actuated switch being in communication with said pressurized fluid port, a first fluid conduit communicating between the output port of said pressure-actuated switch and said hydraulic cylinder for the application of pressurized hydraulic fluid behind said hydraulic piston, a check valve in said first fluid conduit for preventing reverse flow of fluid, said pressure gauge being in communication with said first conduit for measuring the fluid pressure therein, said face deflecting movement limiting means comprising an electric motor for driving said hydraulic pump, an electrical energization circuit for said motor, and a first electrical switch in said energization circuit.

4. A face tension measuring device as defined in claim 3 wherein said face deflecting movement limiting means further comprises a gauge rod secured in spaced, parallel relation with respect to said piston rod and movable in unison therewith, a clamp block having an opening through which said gauge rod is slidingly received, means for normally retaining said clamp rod at a first position with respect to said racket supporting means, means controlled by the close circuiting of said pressure-actuated switch for fixing said clamp block with respect to said gauge rod so that it moves in unison therewith and with said piston rod, said clamp block comprising means for open circuiting said first electrical switch upon said clamp block having been carried from its first position to a second position.

5. A face tension measuring device as defined in claim 4, wherein said clamp block fixing means comprises an electrical solenoid, an electrical energizing circuit for said solenoid, said pressure-actuated electrical switch being connected in series in said solenoid energizing circuit.

* * * * *